(12) United States Patent
Rajan et al.

(10) Patent No.: US 11,400,790 B2
(45) Date of Patent: Aug. 2, 2022

(54) CONCENTRIC HYDRAULIC RIDE HEIGHT ACTUATOR FOR A MOTOR VEHICLE

(71) Applicant: Schaeffler Technologies AG & Co. KG, Herzogenaurach (DE)

(72) Inventors: Alan Abraham Rajan, Wooster, OH (US); Chris Luipold, Wadsworth, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 163 days.

(21) Appl. No.: 16/777,441

(22) Filed: Jan. 30, 2020

(65) Prior Publication Data
US 2021/0237530 A1 Aug. 5, 2021

(51) Int. Cl.
*B60G 17/08* (2006.01)
*B60G 15/06* (2006.01)
*B62D 21/11* (2006.01)

(52) U.S. Cl.
CPC ........... *B60G 17/08* (2013.01); *B60G 15/062* (2013.01); *B62D 21/11* (2013.01); *B60G 2202/12* (2013.01); *B60G 2202/24* (2013.01); *B60G 2202/312* (2013.01); *B60G 2202/413* (2013.01); *B60G 2204/128* (2013.01); *B60G 2204/201* (2013.01)

(58) Field of Classification Search
CPC .......... F16F 9/0245; F16F 9/0263; F16F 9/56; B60G 2500/30; B60G 2500/202; B60G 2400/252; B60G 2800/914; B60G 17/08; B60G 15/062; B60G 2202/12; B60G 2204/201; B60G 2202/312; B60G 2202/413; B60G 2204/128; B60G 2202/24; B62D 21/11
See application file for complete search history.

(56) References Cited

U.S. PATENT DOCUMENTS

| | | | | |
|---|---|---|---|---|
| 4,159,105 A | * | 6/1979 | Vander Laan | B60G 15/063 137/630.2 |
| 4,830,395 A | * | 5/1989 | Foley | B60G 17/0272 267/177 |
| 5,094,407 A | * | 3/1992 | Jampy | F16F 9/06 244/104 FP |
| 5,553,836 A | * | 9/1996 | Ericson | B60G 11/16 267/177 |
| 5,586,781 A | | 12/1996 | Anderson | |
| 5,727,286 A | * | 3/1998 | Shen | E05F 3/02 16/49 |
| 6,079,725 A | * | 6/2000 | Lazaros | A61G 5/08 188/301 |
| 6,676,119 B2 | * | 1/2004 | Becker | B60G 17/0272 267/177 |

(Continued)

*Primary Examiner* — Paul N Dickson
*Assistant Examiner* — Timothy Wilhelm
(74) *Attorney, Agent, or Firm* — Davidson, Davidson & Kappel, LLC (57) ABSTRACT

A hydraulic ride height actuator system for providing variation of a ride height at a front end of a vehicle is provided includes a strut and an actuator including a piston and a housing axially movable with respect to the piston. The housing is fastened to an upper end of the strut. The piston and the housing define a hydraulic chamber. An increase in a volume of the hydraulic chamber forces the housing upward to vary the ride height.

20 Claims, 5 Drawing Sheets

(56) References Cited

U.S. PATENT DOCUMENTS

| | | | |
|---|---|---|---|
| 7,967,117 B2* | 6/2011 | Abe | F16F 9/54 188/299.1 |
| 8,205,864 B2* | 6/2012 | Michel | H02K 41/02 267/218 |
| 8,418,451 B2* | 4/2013 | Stanger | E02F 3/38 60/372 |
| 8,573,573 B2* | 11/2013 | Michel | B60G 17/021 267/218 |
| 8,602,429 B2* | 12/2013 | Nguyen | F16F 9/56 280/124.162 |
| 8,657,333 B2* | 2/2014 | Young | F42B 5/16 280/737 |
| 8,702,075 B1* | 4/2014 | Moorefield | B60G 15/063 267/177 |
| 8,702,109 B2 | 4/2014 | Ryan et al. | |
| 8,763,981 B2* | 7/2014 | Friesen | A47C 3/30 248/565 |
| 8,783,696 B2* | 7/2014 | Murakami | B60G 13/08 280/5.514 |
| 8,807,574 B2* | 8/2014 | Kohlhauser | B60G 17/00 280/5.51 |
| 9,067,636 B2* | 6/2015 | Murakami | B60G 17/044 |
| 9,068,616 B1* | 6/2015 | Serbu | B60G 17/021 |
| 9,180,746 B2* | 11/2015 | Kasuga | B60G 17/0155 |
| 9,187,141 B2* | 11/2015 | Kuo | B62J 1/08 |
| 9,239,089 B2* | 1/2016 | Jun | F16F 9/0245 |
| 9,340,253 B2* | 5/2016 | Sumida | B62K 25/06 |
| 9,352,631 B2* | 5/2016 | Mochizuki | F16F 9/56 |
| 9,527,365 B2* | 12/2016 | Mochizuki | F16F 9/56 |
| 9,714,688 B2* | 7/2017 | Chu | B60G 15/063 |
| 10,160,279 B2 | 5/2018 | Khaja et al. | |
| 10,161,072 B2* | 12/2018 | Kim | D06F 37/20 |
| 10,682,893 B2* | 6/2020 | Schatzberger | B62K 25/04 |
| 2003/0116896 A1* | 6/2003 | Obert | F16F 9/0263 267/64.12 |
| 2004/0036206 A1* | 2/2004 | Loser | B60G 17/021 267/218 |
| 2009/0095584 A1* | 4/2009 | Kondo | F16F 15/03 188/267 |
| 2011/0227301 A1* | 9/2011 | Nagai | B60G 17/04 280/6.157 |
| 2013/0199399 A1* | 8/2013 | Young | B60R 21/264 102/530 |
| 2013/0295301 A1* | 11/2013 | Schmitt | B60R 21/232 428/12 |
| 2015/0290992 A1* | 10/2015 | Mochizuki | F16F 9/46 280/5.514 |
| 2016/0319897 A1* | 11/2016 | Mochizuki | F16F 9/062 |
| 2019/0193846 A1* | 6/2019 | Luce | B64C 25/28 |
| 2019/0225297 A1* | 7/2019 | Mochizuki | B62K 25/10 |
| 2021/0146739 A1* | 5/2021 | Schmidt | B60G 17/044 |

\* cited by examiner

CONCENTRIC HYDRAULIC RIDE HEIGHT ACTUATOR FOR A MOTOR VEHICLE

The present disclosure relates generally to hydraulic height actuators and more specifically to hydraulic height actuators for motor vehicles.

BACKGROUND

In motor vehicles, hydraulic ride height actuators offers ride height variation at the front end of the vehicle. At low speeds the actuator helps lift the vehicle to increase ground clearance and at high speeds the actuator helps lower the vehicle, reducing the frontal area thereby reducing drag and hence increasing fuel economy.

SUMMARY OF THE INVENTION

A hydraulic ride height actuator system for providing variation of a ride height at a front end of a vehicle is provided. The hydraulic ride height actuator system includes a strut and an actuator including a piston and a housing axially movable with respect to the piston. The housing is fastened to an upper end of the strut. The piston and the housing define a hydraulic chamber and an increase in a volume of the hydraulic chamber forces the housing upward to vary the ride height.

In embodiments of the hydraulic ride height actuator system, the housing and the piston may be concentric with each other. The housing may include an inner section having an annular cylindrical shape and an outer section having an annular cylindrical shape. An upper portion of the piston may be radially between the inner section and the outer section. The upper portion of the piston may have an annular cylindrical shape. The hydraulic ride height actuator system may further include a radially inner seal held between an inner circumferential surface of the upper portion of the piston and an outer circumferential surface of the inner section of the housing, and a radially outer seal held between an outer circumferential surface of the upper portion of the piston and an inner circumferential surface of the outer section of the housing. The hydraulic ride height actuator system may further include a mount fixed on top of the housing that is configured for being attached to a chassis of the vehicle. The hydraulic ride height actuator system may further include a fastener fixing the upper end of the strut with respect to the mount. The housing may be fastened to the upper end of the strut by the mount and the fastener. The hydraulic ride height actuator system may further include a stopper positioned radially inside of the housing and held at the bottom of the mount on the strut. The hydraulic ride height actuator system may further include a spring surrounding a portion of the strut. The spring may be held between an upper spring support and a lower spring support. The hydraulic ride height actuator system may further include a bearing sandwiched axially between the upper spring support and the piston to allow rotational movement of the upper spring support with respect to the piston. The bearing may include a first race axially contacting the piston and a second race axially contacting the upper spring support. The hydraulic ride height actuator system may further include a bellows extending from the lower spring support to the upper spring support. The strut may include a strut piston and a strut base defining an interface and the bellows may surround the interface. The strut may include a strut base and a strut piston movable axially with respect to the strut base. The strut piston may be movable upwardly by the increase in the volume of the hydraulic chamber. The hydraulic ride height actuator system may further include a fluid supply line configured for providing fluid into the hydraulic chamber. An outlet of the fluid supply line may be above the piston.

A method of constructing a hydraulic ride height actuator system for providing variation of a ride height at a front end of a vehicle. The method includes providing an actuator including a piston inserted into a housing and fastening an upper end of a strut to the housing. The piston and the housing are axially movable with respect to the piston. The piston and the housing define a hydraulic chamber and an increase in a volume of the hydraulic chamber forces the housing upward to vary the ride height.

In embodiments of the method, the strut may include a strut base and a strut piston movable axially with respect to the strut base. The strut piston may be moved upwardly by the increase in the volume of the hydraulic chamber. The housing and the piston may be concentric with each other. The housing may include an inner section having an annular cylindrical shape and an outer section having an annular cylindrical shape. An upper portion of the piston may be radially between the inner section and the outer section. The upper portion of the piston may have an annular cylindrical shape. The fastening the upper end of the strut to the housing may include fixing a mount top of the housing and fastening the mount to the upper end of the strut by a fastener. The mount may be configured for being attached to a chassis of the vehicle. The method may further include attaching a rubber stopper to the strut at a bottom of the mount and inside of the housing. The method may further include rotatably supporting the piston on top of a spring assembly including an upper spring support and a lower spring support holding a spring.

BRIEF DESCRIPTION OF THE DRAWINGS

The present disclosure is described below by reference to the following drawings, in which.

DETAILED DESCRIPTION

The disclosure provides a less expensive ride height actuator system including a concentric slave cylinder (CSC) configuration, i.e., a concentric hydraulic ride height actuator (CHRHA), which can be made out of plastic. The CHRHA of the present disclosure packages well in a suspension strut system. The concentric slave cylinder is integrated into the suspension by attaching the cylinder to the chassis. A conventional strut can be used. A rubber stopper prevents the strut from bottoming out from sudden impulses.

Figure 1:
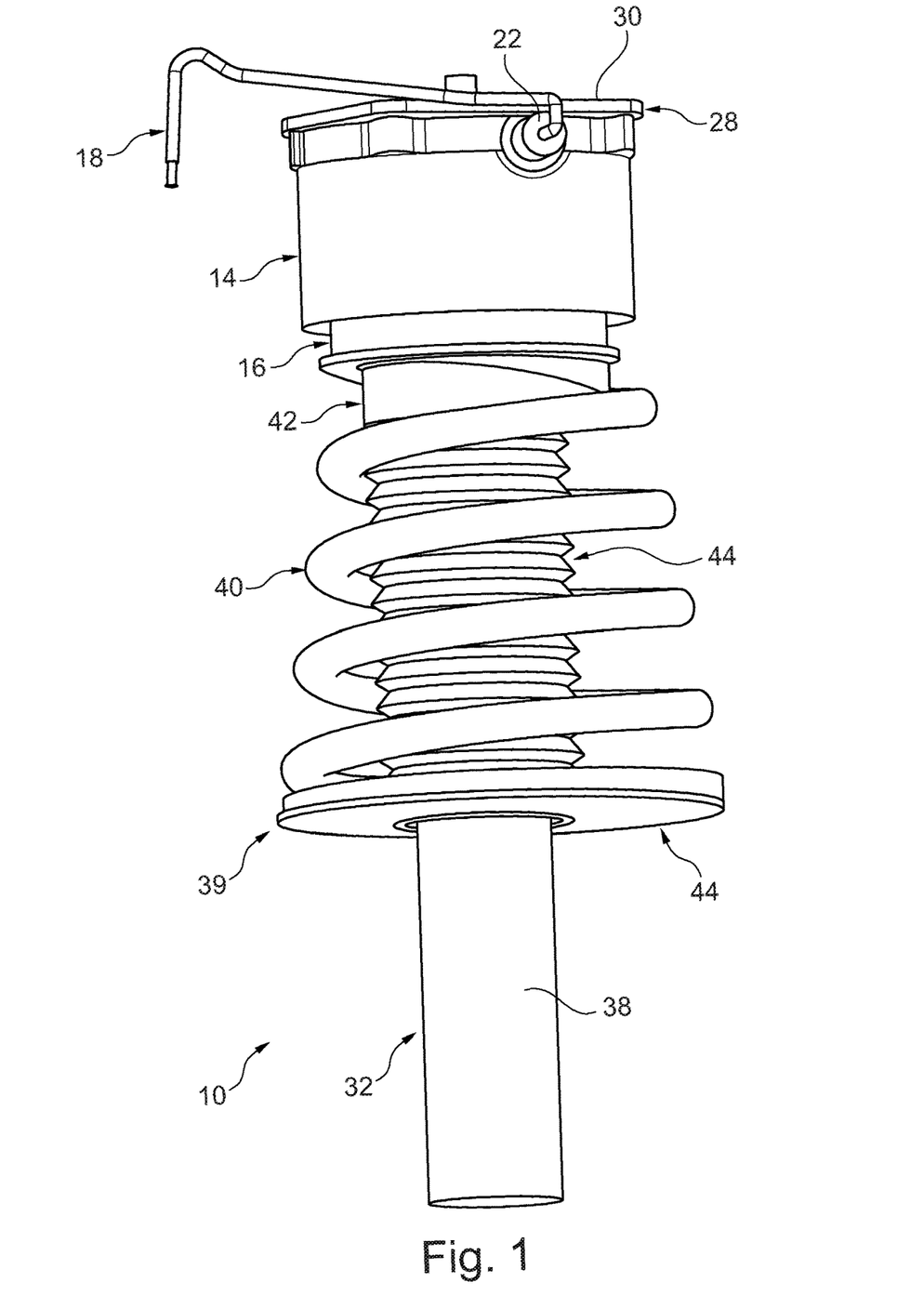
FIG. 1 schematically shows an elevation view of a ride height actuator system including an actuator for providing ride height variation at a front end of a vehicle.
Figure 2:
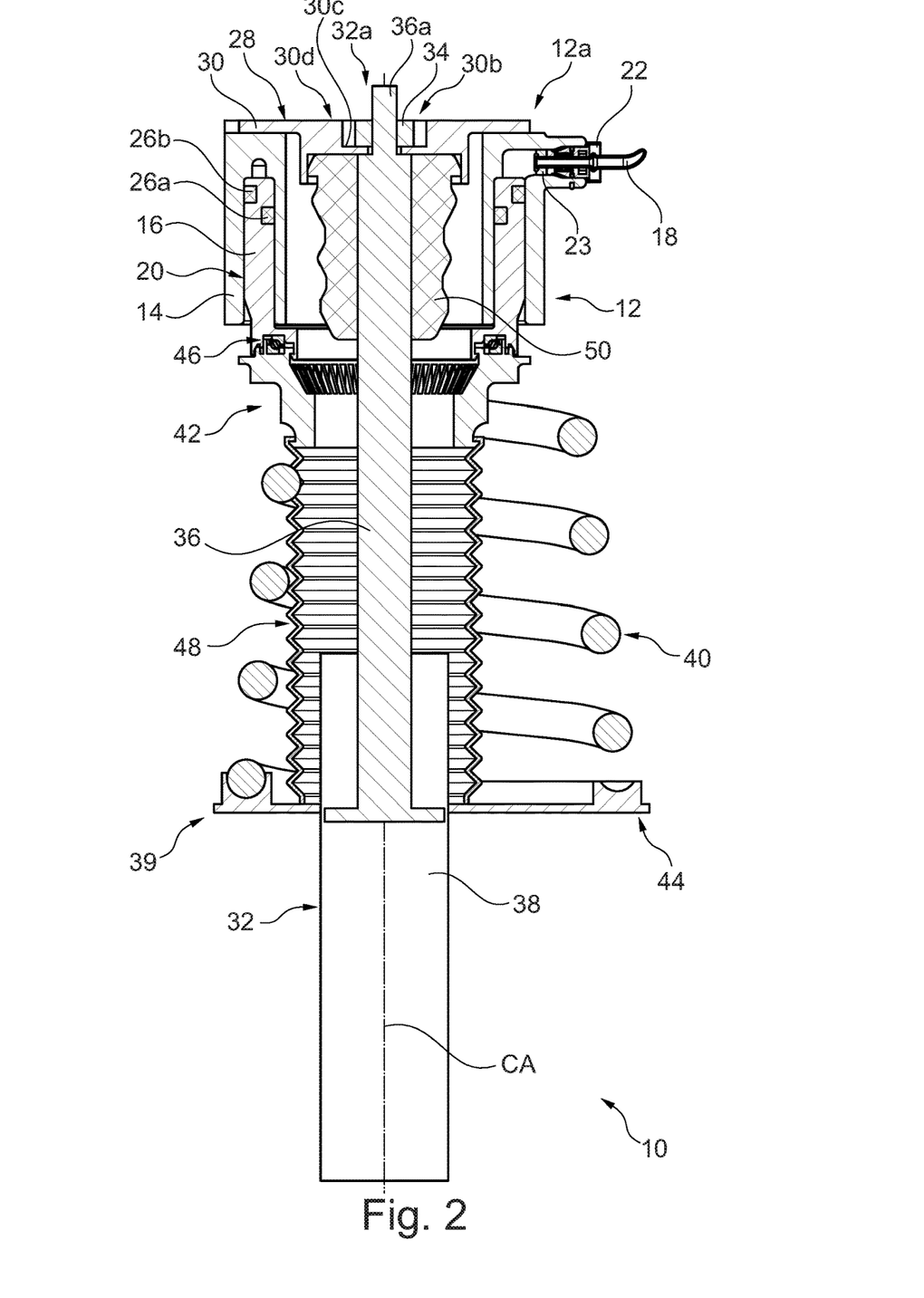
FIG. 2 shows a radial cross-sectional view of the ride height actuator system shown in FIG. 1.
Figure 3:
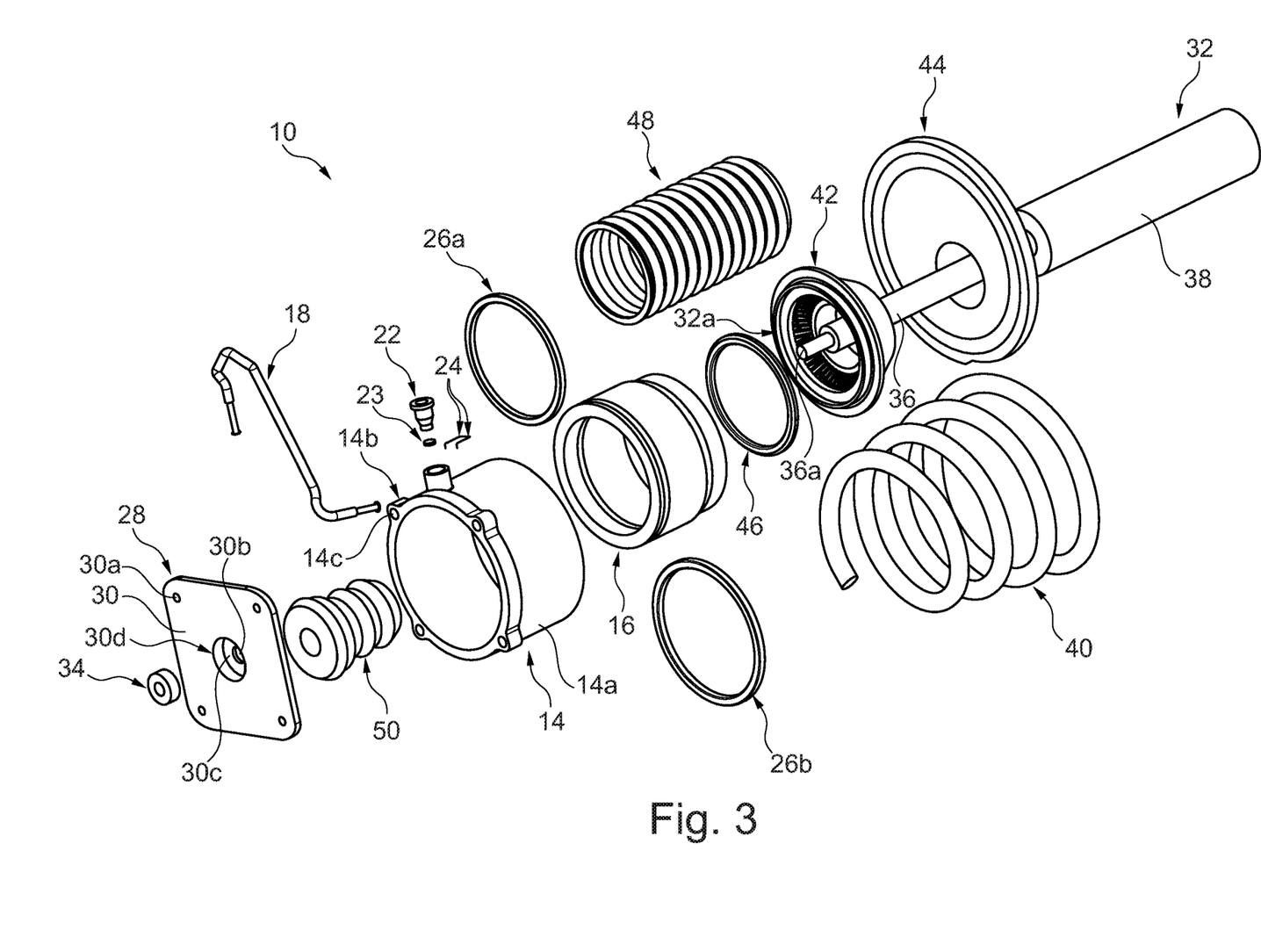
FIG. 3 shows an exploded view of the ride height actuator system shown in FIG. 1.

FIGS. 1 to 3 show different views of a ride height actuator system 10 including a CHRHA 12 for providing ride height variation at a front end of a vehicle. FIG. 1 shows an elevation view, FIG. 2 shows a radial cross-sectional view and FIG. 3 shows an exploded view. The CHRHA 12 provides improved fuel economy by reducing drag at high speeds. At low speeds CHRHA 12 helps lift the vehicle to increase ground clearance and at high speeds CHRHA 12 helps lower the vehicle, reducing the frontal area thereby reducing drag and hence increasing fuel economy.

CHRHA 12, which is discussed in further detail below with respect to FIG. 4, includes a housing 14 and a piston 16, with housing 14 being axially slidable with respect to piston 16. In one embodiment, housing 14 and piston 16 are both made of plastic. Housing 14 and piston 16 each have a generally hollow cylindrical shape and are arranged concentric with each other. CHRHA 12 further includes a fluid supply line 18 for providing fluid to a fluid chamber 20. Increasing the volume of fluid chamber 20 forces housing 14 to move with respect to piston 16, causing CHRHA 12 to move from a retracted orientation to an extended orientation. The movement of CHRHA 12 from the retracted orientation to the extended orientation increases the ride height of the vehicle by lifting a chassis 56 (FIG. 4) of the vehicle upward. Fluid supply line 18 is mounted onto housing 14 by an inlet valve 22 which is held in place on housing 14 by retaining clips 24 (FIG. 3). A seal 23 maintains the hydraulic pressure in chamber 20 and prevents the fluid from seeping out at the interface between inlet valve 22 and housing 14.

Housing 14 is axially slidable with respect to piston 16 along a center axis CA of system 10. Unless otherwise specified, the terms axial, radial, circumferential and derivatives thereof are used in reference to center axis CA. CHRHA 12 includes a radially inner seal 26a and a radially outer seal 26b for slidably sealing piston 16 with respect to housing 14, thus preventing fluid from leaking out of chamber 20 between piston 16 and housing 14. As shown in FIG. 3, housing 14 and piston 16 each have a cylindrical shape such that chamber 20 is also cylindrical, and seals 26a, 26b are rings.

Ride height actuator system 10 further includes a mount 28 attached to an upper end 12a of actuator 12 and configured for being mounted onto the vehicle chassis 56 (FIG. 4) serving as ground. More specifically, base 14 is in the form of a chassis mounting plate 30 configured for being mounted to chassis 56 (FIG. 4) via bolts passing through fastening holes 30a (FIG. 3) in chassis mounting plate 30. As shown in FIG. 3, chassis mounting plate 30 has a generally rectangular shape such that holes 30a are spaced radially outward from the outer circumferential surface of an outer section 14a of housing 14. Housing 14 includes flange sections 14b protruding radially away from outer circumferential surface of an outer section 14a of housing 14. Each of flange sections 14b also includes a respective fastening hole 14c. Each of holes 14c is aligned with a respective one of holes 30a such that bolts can be passed through holes 14c and holes 30a to fix system 10 onto the chassis 56 (FIG. 4).

Chassis mounting plate 30 also includes a central hole 30b for receiving an upper end 32a of a strut 32. Central hole 30b is surrounded by an annular shoulder 30c that defines a recess 30d for receiving a fastener in the form a strut nut 34. Upper end 32a of strut 32, which is an upper end of a strut piston 36 of strut 32, includes a threaded portion 36a having a threaded outer surface for intermeshing with threads on strut nut 34 to axially fix upper end 32a of strut 32 to chassis mounting plate 30 via contact between nut 34 and annular shoulder 30c. Strut 32 is positioned coaxial with center axis CA and also includes a strut base 38 into which strut piston 36 axially extends. Strut piston 36 is axially movable and rotatably movable with respect to strut base 38 in a known manner.

System 10 further includes a spring assembly 39 including a spring 40 held axially between an upper spring support 42 and a lower spring support 44. The upper end of spring 40 is fixed to upper spring support 42 and the lower end of spring 40 is fixed to lower spring support 44. Lower spring support 44 is fixed on the outer circumferential surface of strut base 38, for example by strut base 38 being pressed and centered on lower spring support 44. A bearing 46 is sandwiched axially between upper spring support 42 and piston 16 to allow relative rotation between upper spring plate 42 and piston 16. Bearing 46, as shown more clearly in FIG. 4, includes an inner race 46a pressed into piston 16, an outer race 46b pressed into upper spring support 42 and a plurality of rolling bodies 46c between inner race 46a and outer race 46b. As the wheels of the vehicle turn, bearing 46 allows relative rotational motion of upper spring support 42, strut base 38, lower spring support 44 and spring 40 together, while piston 16, housing 14, plate 30 and strut piston 36 are held at ground and do not rotate.

A bellows 48 also extends from upper spring support 42 to lower spring support 44 and radially surrounds a portion of strut 32. Spring 40 radially surrounds bellows 48. Bellows 48 keeps dust and other contaminants from entering the interface between strut piston 36 and strut base 38.

System 10 further includes a stopper 50, which in a preferred embodiment is formed of rubber. Stopper 50 is mounted coaxial with strut piston 36 on upper end 32a of strut 32 below threaded portion 36a. Stopper 50 is positioned above upper spring support 42 and below chassis mounting plate 30 and sits within an internal cavity 14d of housing 14.

Figure 4:
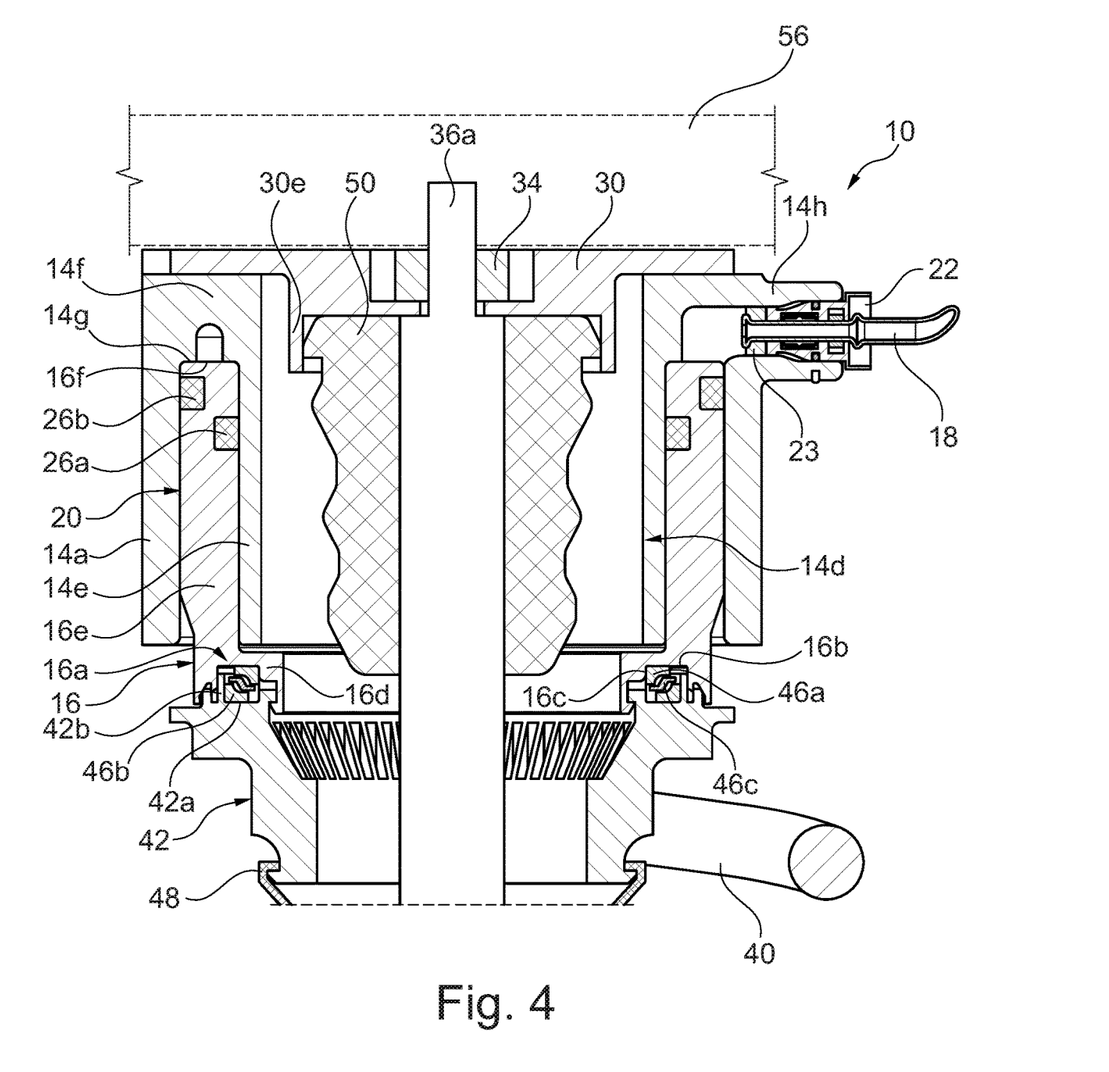
FIG. 4 shows an enlarged view of a top portion of the ride height actuator system shown in FIG. 1.

FIG. 4 shows an enlarged view of a top portion of system 10. As shown in FIG. 4, strut piston 36 extends axially through bellows 48, upper spring support 42, stopper 50, piston 16, housing 14 and chassis mounting plate 30. An upper end of bellows 48 is snapped onto a lower end of upper spring support 42 to axially fix upper spring support 42 to the upper end of bellows 48.

A radially extending upper surface 42a of upper spring support 42 contacts a lower surface of outer race 46b of bearing 46, and a lip 42b extending upward from surface 42a contacts an outer circumferential surface of outer race 46b. The lower end of piston 16 includes an annular groove 16a receiving bearing 46. In groove 16a, piston 16 includes a radially extending lower surface 16b contacting the upper surface of inner race 46a and an axially extending wall 16c contacting an inner circumferential surface of inner race 46a. Groove 16a is formed in a radially extending ring section 16d of piston 16, which extends radially inward from an annular cylindrical section 16e of piston 16, which defines an upper portion of piston 16.

Annular cylindrical section 16e of piston 16 is received in chamber 20, which has an annular cylindrical shape and is defined radially between outer section 14a and an inner section 14e of housing 14, both of which have an annular cylindrical shape. Chamber 20 is axially delimited at the upper end by an annular disc shaped section 14f of housing 14. Radially inner seal 26a is held in an inner circumferential surface of section 16e and contacts the outer circumferential surface of section 14e; and radially outer seal 26b is held in an outer circumferential surface of section 16e and contacts the inner circumferential surface of section 14a. A piston stop surface 16f, which is formed on top of cylindrical section 16e, contacts a housing stop surface 14g to limit downward movement of housing 14 with respect to piston 16.

Housing 14 includes a fluid inlet port 14h protruding radially outward from outer section 14a. Fluid supply line 18 extends into port 14g and is held in port 14g by valve 22, which radially surrounds supply line 18 and sticks out of the inlet end of port 14g, and seal 23, which abuts the outlet end of valve 22 and radially surrounds the outlet end of supply line 18. The outlet of fluid supply line 18 is above piston 16.

A lower surface of chassis mounting plate 30 rests on an upper surface of disc shaped section 14f of housing 14. On the bottom thereof, mounting plate 30 includes a downwardly protruding annular lip 30e receiving and centering a top end of stopper 50. During sudden road impulses, the rubber stopper 50 provides as a safety stop to prevent the strut 13 from bottoming out and causing damage to the system 10 by the bottom of rubber stopper contacting the top of strut base 38.

Figure 5A:
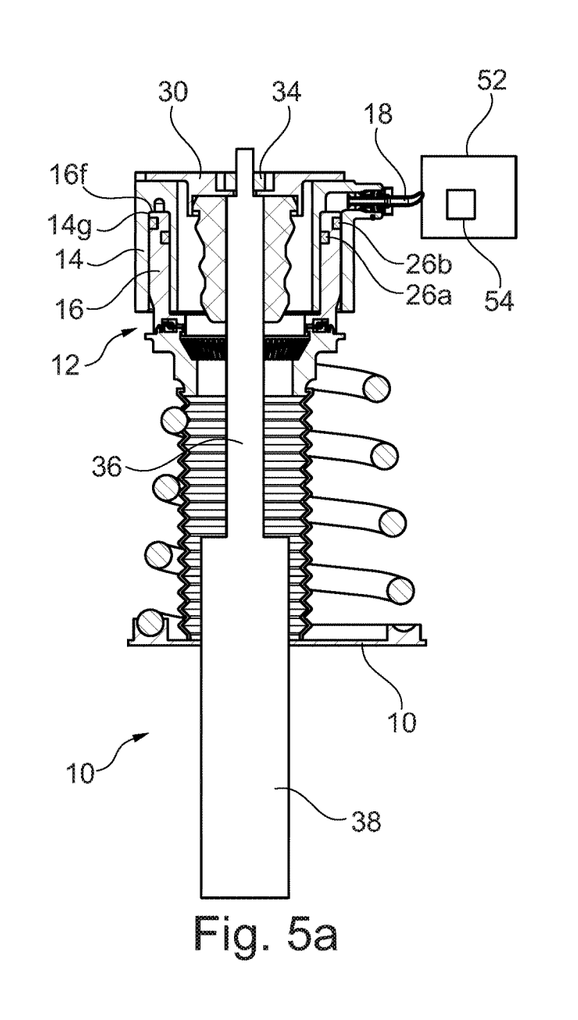
FIG. 5a shows a radial cross-sectional view of the ride height actuator system shown in FIG. 1 in a retracted orientation.
Figure 5B:
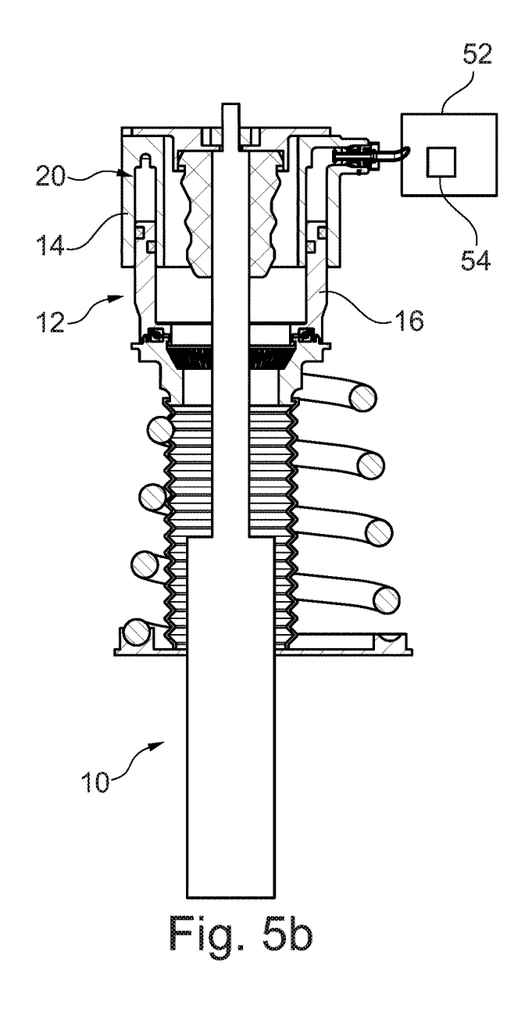
FIG. 5b shows a radial cross-sectional view of the ride height actuator system shown in FIG. 1 in an extended orientation.

FIGS. 5a and 5b illustrate the operation of CHRHA 12. FIG. 5a shows CHRHA 12 in a retracted orientation and FIG. 5b shows CHRHA 12 in an extended orientation. When CHRHA 12 is actuated and the fluid is forced in fluid chamber 20 from an external pump 52 using hydraulic line 18, chamber 20 extends axially by the hydraulic fluid being pressed against the piston 16, forcing the hydraulic cylinder housing 14 to move up from the retracted orientation shown in FIG. 5a to the extended orientation shown in FIG. 5b, thereby lifting the vehicle chassis 56 (FIG. 4) fixed to chassis mounting plate 30.

As the cylinder housing 14 lifts upward, the strut piston 36 fastened onto the chassis mounting plate 30 by strut nut 34, also extends upwardly.

The extended orientation can be held by a control valve 54 at pump 54 to maintain pressure in CHRHA 12. When the pressure is withdrawn from chamber 20, housing 14 moves down until stop surface 16f of piston 16 hits stop surface 14g of housing 14. Seals 26a, 26b keep the hydraulic fluid from seeping through the interface between piston 16 and housing 14.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS

CA center axis
10 ride height actuator system
12 concentric hydraulic ride height actuator
14 housing
14a outer section
14b flange sections
14c fastening holes
14d internal cavity
14e inner section
14f annular disc shaped section
14g housing stop surface
14h fluid inlet port
16 piston
16a groove
16b radially extending lower surface
16c axially extending wall
16d radially extending ring section
16e annular cylindrical section
16f piston stop surface
18 fluid supply line
20 fluid chamber
22 inlet valve
23 seal
24 retaining clips
26a radially inner seal
26b radially outer seal
28 mount
30 chassis mounting plate
30a fastening holes
30b central hole
30c annular shoulder
30d recess
30e downwardly protruding annular lip
32 strut
32a upper end
34 strut nut
36 strut piston
36a threaded portion
38 strut base
39 spring assembly
40 spring
42 upper spring support
42a radially extending upper surface
42b lip
44 lower spring support
46 bearing
46a inner race
46b outer race
46c rolling bodies
48 bellows
50 stopper
52 external pump
54 control valve
56 chassis

What is claimed is:

1. A hydraulic ride height actuator system for providing variation of a ride height at a front end of a vehicle, the hydraulic ride height actuator system comprising:
    a strut; and
    an actuator including a piston and a housing axially movable with respect to the piston, the housing being fastened to an upper end of the strut, the piston and the housing defining a hydraulic chamber, an increase in a volume of the hydraulic chamber forcing the housing upward to vary the ride height; and
    a mount fixed on top of the housing, the mount configured for being attached to a chassis of the vehicle,
    wherein the strut includes a strut base and a strut piston movable axially with respect to the strut base, the strut piston being movable upwardly by the increase in the volume of the hydraulic chamber, the strut piston extending axially outside of the strut base and through the piston, the housing and the mount past a top surface of the mount.

2. The hydraulic ride height actuator system as recited in claim 1 wherein the housing and the piston are concentric with each other.

3. The hydraulic ride height actuator system as recited in claim 1 wherein the housing includes an inner section having an annular cylindrical shape and an outer section having an annular cylindrical shape, and an upper portion of the piston is radially between the inner section and the outer section.

4. The hydraulic ride height actuator system as recited in claim 3 wherein the upper portion of the piston has an annular cylindrical shape.

5. The hydraulic ride height actuator system as recited in claim 4 further comprising a radially inner seal held between an inner circumferential surface of the upper portion of the piston and an outer circumferential surface of the inner section of the housing; and a radially outer seal held between an outer circumferential surface of the upper portion of the piston and an inner circumferential surface of the outer section of the housing.

6. The hydraulic ride height actuator system as recited in claim 1 further comprising a fastener fixing the upper end of the strut with respect to the mount, the housing being fastened to the upper end of the strut by the mount and the fastener.

7. The hydraulic ride height actuator system as recited in claim 6 wherein the fastener is a strut nut received in a recess in the mount below the top surface of the mount.

8. The hydraulic ride height actuator system as recited in claim 1 further comprising a stopper positioned radially inside of the housing and held at a bottom of the mount on the strut.

9. The hydraulic ride height actuator system as recited in claim 1 further comprising a spring surrounding a portion of the strut, the spring being held between an upper spring support and a lower spring support.

10. The hydraulic ride height actuator system as recited in claim 9 further comprising a bellows extending from the lower spring support to the upper spring support, the strut piston and strut base defining an interface, the bellows surrounding the interface.

11. The hydraulic ride height actuator system as recited in claim 1 further comprising a fluid supply line configured for providing fluid into the hydraulic chamber, an outlet of the fluid supply line being above the piston.

12. A hydraulic ride height actuator system for providing variation of a ride height at a front end of a vehicle, the hydraulic ride height actuator system comprising:
   a strut; and
   an actuator including a piston and a housing axially movable with respect to the piston, the housing being fastened to an upper end of the strut, the piston and the housing defining a hydraulic chamber, an increase in a volume of the hydraulic chamber forcing the housing upward to vary the ride height;
   a spring surrounding a portion of the strut, the spring being held between an upper spring support and a lower spring support; and
   a bearing sandwiched axially between the upper spring support and the piston to allow rotational movement of the upper spring support with respect to the piston,
   wherein the bearing includes a first race received in annular groove in the piston and axially contacting the piston and a second race axially contacting the upper spring support.

13. The hydraulic ride height actuator system as recited in claim 12 wherein the bearing includes rolling bodies between the first race and second race, the upper spring support including a radially extending surface and a lip extending upward from the radially extending surface, the lip contacting an outer circumferential surface of the second race.

14. The hydraulic ride height actuator system as recited in claim 12 wherein in the annular groove, the piston includes a radially extending lower surface contacting an upper surface of the first race and an axially extending wall contacting an inner circumferential surface of the first race.

15. A method of constructing a hydraulic ride height actuator system for providing variation of a ride height at a front end of a vehicle, the method comprising:
   providing an actuator including a piston inserted into a housing; and
   fastening an upper end of a strut to the housing, the piston and the housing axially movable with respect to the piston, the piston and the housing defining a hydraulic chamber, an increase in a volume of the hydraulic chamber forcing the housing upward to vary the ride height, the piston including annular cylindrical section inside the housing and a radially extending ring section extending radially inward from an inner circumferential surface of the annular cylindrical section; and
   inserting a race of a bearing into the radially extending ring section.

16. The method as recited in claim 15 wherein the strut includes a strut base and a strut piston movable axially with respect to the strut base, the strut piston being moved upwardly by the increase in the volume of the hydraulic chamber.

17. The method as recited in claim 16 wherein the housing and the piston are concentric with each other, the housing including an inner section having an annular cylindrical shape and an outer section having an annular cylindrical shape, the annular cylindrical section of the piston being radially between the inner section and the outer section.

18. The method as recited in claim 17 wherein the fastening the upper end of the strut to the housing includes fixing a mount on top of the housing and fastening the mount to the upper end of the strut by a fastener, the mount configured for being attached to a chassis of the vehicle.

19. The method as recited in claim 18 further comprising attaching a rubber stopper to the strut at a bottom of the mount and inside of the housing.

20. The method as recited in claim 15 further comprising rotatably supporting the piston on top of a spring assembly including an upper spring support and a lower spring support holding a spring.

* * * * *